United States Patent [19]

Newkirk et al.

[11] 3,710,770
[45] Jan. 16, 1973

[54] FUEL SYSTEM

[75] Inventors: Marc S. Newkirk, Lynnfield; Arnold G. Falabella, Lawrence, both of Mass.

[73] Assignee: American Environmental Research Corp., Malden, Mass.

[22] Filed: Oct. 16, 1970

[21] Appl. No.: 81,424

[52] U.S. Cl..................................123/120, 48/184
[51] Int. Cl...........................................F02m 21/02
[58] Field of Search .....................123/120; 48/184

[56] References Cited

UNITED STATES PATENTS

| | | | |
|---|---|---|---|
| 664,025 | 12/1900 | Nash | 123/120 |
| 1,507,533 | 9/1924 | Walker et al. | 123/120 |

*Primary Examiner*—Wendell E. Burns
*Attorney*—Cesari and McKenna

[57] ABSTRACT

A fuel system for a gaseous fueled internal combustion engine injects gas into a mixing chamber for mixing with air by way of a plurality of check valves. The check valves prevent the buildup of an explosive fuel-air mixture in the fuel lines. In a preferred embodiment, the check valves have progressively increasing cracking pressures so that, as the operator opens the throttle, the increasing pressure differential across the valves causes them to open in succession so that a precisely controlled amount of gas is fed to the chamber for the prevailing engine speed and load conditions. During idling, gaseous fuel is fed to the mixing chamber through a separate fuel line to provide the proper fuel-air mixture to run the engine under no load. Also, engine exhaust products are injected into the system's air intake just above the mixing chamber to blanket the gases in the mixing chamber and thus contain them. Further provision is made for shutting off the supply of gas in the event that the engine does not start or stalls as a safety measure and to conserve fuel.

11 Claims, 2 Drawing Figures

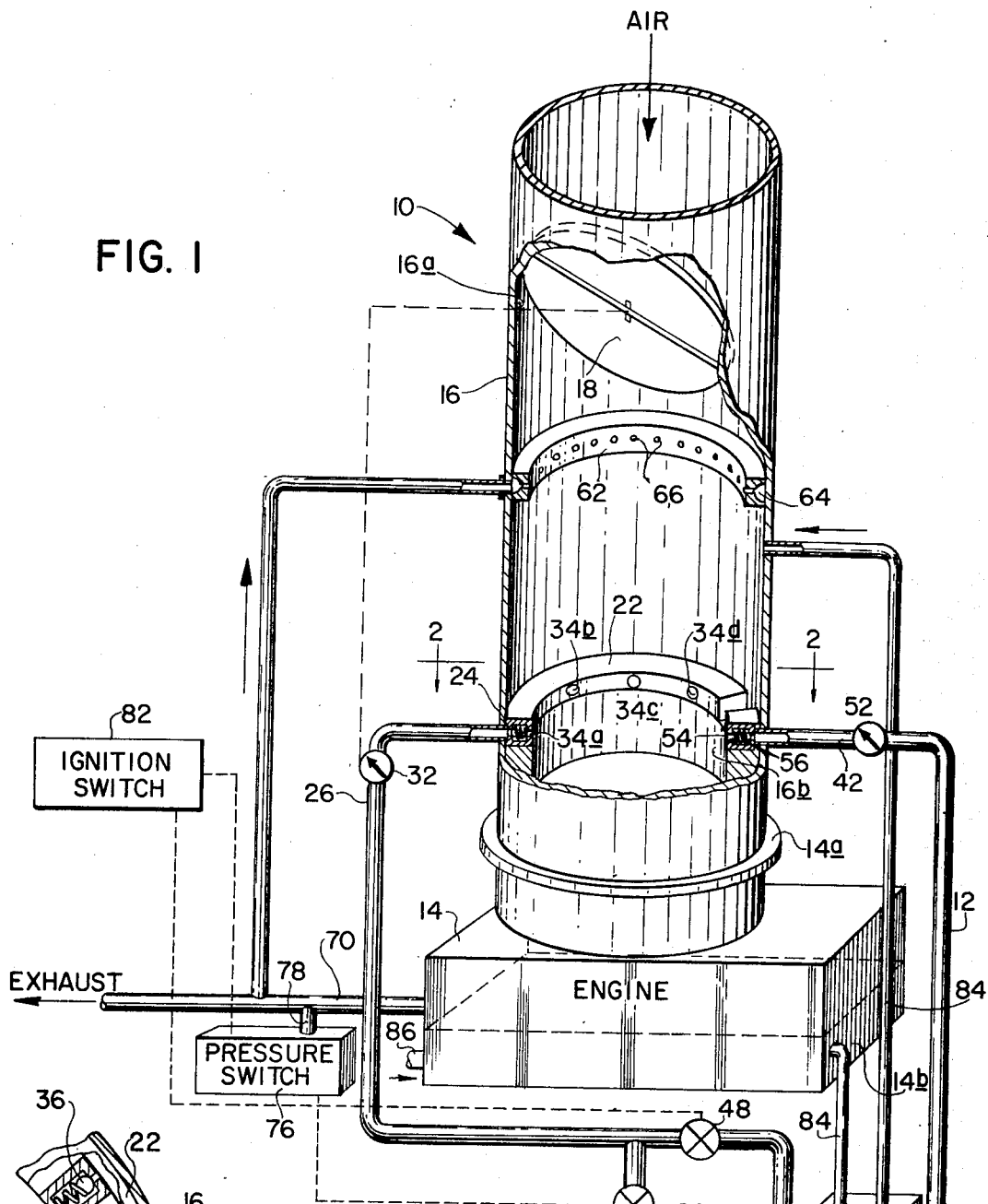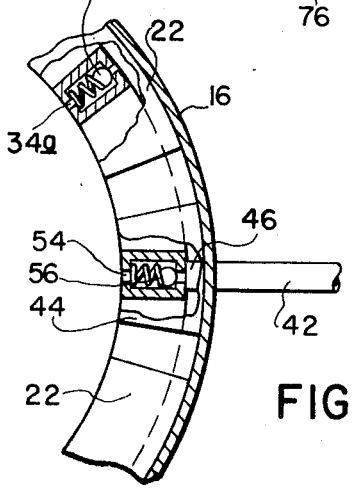

FUEL SYSTEM

BACKGROUND OF THE INVENTION

Considerable work has been done to develop an internal combustion engine which burns a gaseous fuel such as hydrogen. This is because the principal exhaust product of hydrogen is water vapor which does not pollute the atmosphere. Such an engine is disclosed, for example, in copending application Ser. No. 47,990, filed June 22, 1970, entitled INTERNAL COMBUSTION ENGINE owned by the assignee of the present application.

While gaseous fuel engines of this type have great potential, their wider application and use have been inhibited because of difficulties encountered in maintaining the proper fuel-air mixture in the engine at all engine loads and speeds, including cranking and idling speeds and in controlling the fuel generally so as to conserve it and to minimize the dangers associated with gaseous fuels.

SUMMARY OF THE INVENTION

Accordingly, it is an object of the present invention to provide a gaseous fueled internal combustion engine with a fuel system which does properly control the gas to achieve the correct fuel-air ratio over the entire range of engine loads and speeds.

Another object of the invention is to provide a fuel system for an internal combustion engine which helps to conserve the supply of fuel.

Another object of the invention is to provide a fuel system for a gas fueled internal combustion engine which minimizes the chances of accidental explosion or fire.

Yet another object of the invention is to provide an improved fuel system for an internal combustion engine which minimizes the amount of pollutants generated by the engine.

Yet another object of the invention is to provide a fuel system for an engine of the above type which maximizes the efficiency of the engine.

A further object is to provide a fuel system for an engine of the above type which enables the engine to be started easily.

Other objects will in part be obvious and will in part appear hereinafter.

The invention accordingly comprises the features of construction, combination of elements and arrangement of parts which will be exemplified in the construction hereinafter set forth, and the scope of the invention will be indicated in the claims.

The present engine runs on a gaseous fuel such as hydrogen. The gas is stored in liquid form in a suitably insulated tank. The engine's fuel system which is the main subject of the present invention meters the fuel as a gas to the engine where it is burned in the usual way to generate power.

The fuel system includes a carburetor containing a butterfly valve which regulates the amount of incoming air. The valve is moved by an operator manipulated linkage. This linkage also regulates an adjustable pressure regulator which, in turn, controls the flow of fuel from the tank. The fuel is injected as a gas into the carburetor below the butterfly valve by way of check valves distributed around the wall of the carburetor mixing chamber. These valves open in response to the pressure differential between the fuel line and the interior of the manifold to allow gas into but not out of the carburetor. This feature prevents the accumulation of an explosive fuel-air mixture in the fuel lines.

In some applications, these check valves have progressively increasing cracking pressures. Consequently, as the operator opens the throttle to increase the gas supply pressure and as the initial manifold pressure decreases, the gas is injected into the carburetor through a progressively increasing number of the check valves to meet the increasing demands of the engine.

The engine idles on fuel delivered to the carburetor from the tank via a separate pressure regulator which is arranged to inject sufficient gas into the carburetor to form a mixture which is rich enough to idle the engine smoothly under essentially no load.

Part of the engine exhaust (which is principally low energy steam) is fed back and injected into the carburetor above the gas injection valves. The steam acts as a blanket to contain the hydrogen gas and direct it down into the engine intake manifold for burning. The low energy steam also functions as a working medium during combustion as described in the aforesaid copending application.

Further, provision is made for shutting off the flow of gas in the event that the engine is not operating in order to conserve fuel and to minimize the buildup of an explosive mixture in and around the engine. This will be gone into in more detail later.

Thus, the present system accurately meters gaseous fuel into the engine at different rates depending upon the operating conditions. As a result, the engine runs relatively efficiently over its entire operating range. Also, the system maintains close control over fuel flow for reasons of both economy and safety.

BRIEF DESCRIPTION OF THE DRAWING control

For a fuller understanding of the nature and objects of the invention, reference should be had to the following detailed description taken in connection with the accompanying drawing, in which:

FIG. 1 is a diagrammatic view with parts in section of a fuel system made in accordance with the present invention; and FIG. 2 is a sectional view on a larger scale along line 2—2 of FIG. 1.

DESCRIPTION OF THE PREFERRED EMBODIMENT

Turning now to FIG. 1 of the drawing, a fuel system shown generally at 10 feeds a gas such as hydrogen from a cryogenic tank 12, where the fuel is maintained in liquid form, to an internal combustion engine 14. The system includes a carburetor 16 having an air intake section 16a into which air from the atmosphere is drawn. A throttle controlled butterfly valve 18 is pivotally mounted in the intake section 16a to regulate the flow of incoming air.

Fuel from the supply 12 is injected as a gas into the mixing chamber 16b of the carburetor below butterfly valve 18. More particularly, a circular manifold 22 is spaced below valve 18 within chamber 16b. Manifold 22 extends almost all the way around the wall of the chamber and has an internal passage 24 which extends almost the entire length of the manifold. Fuel from supply 12 is conducted as a gas into the manifold passage 24 via fuel line 26. Line 26 contains a solenoid-operated check valve 28 for reasons to be described later and an adjustable pressure regulator 32 which functions as a throttle. Regulator 32 is linked to butterfly valve 18 so that when the throttle is opened or closed by the operator, the supplies of gas and air to the carburetor are increased or decreased proportionately.

Referring to FIGS. 1 and 2, manifold 22 contains a number of radial ports 34. In the present embodiment, there are eight such ports, four of which are shown and indicated as ports 34a–34d. A ball check valve 36 is located within manifold 22 between the manifold passage 24 and each of the ports 34a–34d. The check valves 36 are arranged so that fluid can flow from the manifold passage 24 through the ports 34a–34d and into the chamber 16b, but not in the opposite direction. Accordingly, the explosive fuel-air mixture in the carburetor cannot back up into the fuel lines and tank and thereby create a safety hazard.

In applications where very precise control over fuel injection is desired, the valves 36 are designed to have different cracking pressures. In other words, in this event, each of the valves 36 opens in response to a selected fluid pressure differential between the manifold passage 24 and chamber 16b. *This pressure differential depends, of course, on the setting of throttle 32 and the negative pressure in the engine intake manifold 14a.* Thus, when the operator opens the throttle 32 slightly, the pressure differential is sufficient to open one valve in one port, say port 34a, with a cracking pressure of 2 psi, so that a precise amount of fuel is injected into the chamber 16b. Then, as the operator opens the throttle further, the fluid pressure differential increases sufficiently to overcome the spring bias of the next valve, i.e., in port 34b, having a cracking pressure of say, 4 psi, so that more fuel is injected into the intake 16. This process continues as the operator opens throttle 32 still further so that more valves 36 having cracking pressures of 6 psi, 8 psi, etc., open, in turn, to inject the precisely controlled amounts of fuel into chamber 16b.

At full throttle, the fuel pressure in manifold passage 24 is sufficient to open all of the valves so that fuel is injected through all of the ports 34 to satisfy the maximum demands of the engine. At the same time, sufficient air is drawn into intake section 16a due to the suction transmitted from engine manifold 14a to maintain a highly combustible fuel-air mixture when the engine is operating normally.

Still referring to FIGS. 1 and 2, the present system has a separate fuel feed section for supplying the engine with a rich fuel-air mixture during idling. More particularly, fuel is fed from tank 12 via a separate fuel line 42 connected to line 26 downstream from valve 28 and leading to a small, separate manifold 44 in chamber 16b. Manifold 44 just fills the gap between the ends of manifold 22 so that both manifolds together form essentially a closed ring within chamber 16b. Manifold 44 contains a cavity 46 which receives fuel from fuel line 42. Line 42 has a solenoid operated shutoff valve 48 for reasons to be discussed later and a pressure regulator 52 which can be set to control the amount of fuel fed to manifold 44 during starting. Once regulator 52 has been properly set, it need not be adjusted thereafter.

Manifold 44 includes a port 54 which opens into passage 16b and a check valve 56 is seated within the manifold between cavity 46 and port 54. The valve 56 allows fuel to flow from passage 46 through port 54, but not in the opposite direction and it has a low cracking pressure, e.g., 2 psi. The valve minimizes the likelihood of backflow into the fuel line 42 for the same reasons noted above in connection with valves 36.

The fuel system 10 also includes a second manifold 62 spaced above manifold 22 in the carburetor section 16a. Manifold 62 is shaped like a ring, extending all around the inside wall of section 16a. The manifold is formed with an internal passage 64 extending almost all around it and a relatively large number of radial ports 66 communicating with passage 64. In a typical embodiment of the invention, there are 30 such ports 66.

A conduit 68 connects the engine exhaust manifold 70 to the manifold passage 64 so that at least part of the engine exhaust is fed to the manifold 62 for injection through ports 66 into the air intake section 16a above the point of injection of the fuel into the carburetor. When the engine is operating, normally, the exhaust which, in the present case, is principally low energy steam, is injected into the intake section 16a as a blanket. The blanket of steam is forced downward by the air drawn into the carburetor 16 so that the steam helps to contain the gaseous fuel injected into chamber 16b and to urge the fuel-air fluid into the engine manifold 14a for burning. This feature is particularly desirable when burning hydrogen fuel because that gas has a relatively long mean free path and it tends to find its way past valve 18 and out of the carburetor unless steps are taken to prevent this. The injection of some exhaust products into the intake to blanket the hydrogen fuel accomplishes this nicely. The injected low energy steam also functions as a working medium during the combustion process as described more particularly in the aforesaid copending application.

As a safety factor, the present system has provision for shutting off the supply of gaseous fuel to the engine in the event that the engine does not start as it should. More particularly, a pressure switch 76 is connected by a branch line 78 to the exhaust line 70. Switch 76 is actuated in response to the pressure buildup in branch line 78 due to the exhaust emanating from the engine 14 when it is running. Switch 76 is connected electrically to the solenoid valve 28 and to the engine's ignition switch 82. Switch 82 is the usual type having ACCESSORY, OFF, IGNITION and START positions. As such, switch 82 is spring-loaded so that the operator must hold it in the START position, otherwise it will return to the IGNITION position.

Switch 82 is connected in parallel with switch 76 and valve 28 so that the valve is normally closed until switch 82 is turned to the START position to crank the engine. To start the engine, the operator turns the switch 82 to START. Whereupon the engine is cranked in the usual way and valve 28 opens allowing gas to flow through line 26 to throttle (regulator) 32. The operator now opens the throttle 32 allowing enough gas to flow into the carburetor to produce a fairly lean fuel-air mixture for easy starting. As soon as the engine starts, the operator releases switch 82 which immediately returns to the IGNITION position as mentioned above. Now, however, with the engine turning over, there is sufficient exhaust pressure in lines 70 and 80 to activate switch 76 so that valve 28 remains open. Of course, if the engine does not start and the operator releases switch 82, valve 28 immediately closes and the fuel supply is shut off so that there is no buildup of an explosive mixture in the various engine parts.

When the engine is idling, a relatively rich fuel-air mixture is desirable for smooth, even engine operation which is an important reason for including separate fuel injection by way of valve 48 during idling. Valve 48 is controlled by switch 82. It is open only when the switch is in its IGNITION position. Thus, once the engine starts and the operator releases switch 82, valve 48 opens so that gas is injected into the carburetor via manifold 44. Adjustment of regulator 52 achieves the proper rich mixture. If throttle 32 is fully closed, the engine runs only on this mixture. As the operator opens the throttle, more and more gas is fed into the carburetor via manifold 22 to provide the amount of fuel necessary to meet the demands of the engine at the prevailing speed and load.

If, for some reason, the engine 14 should stall, the exhaust pressure in manifold 70 soon drops so that switch 76 opens thereby closing valve 28. The gas supply remains shut off until the operator again cranks the engine by moving switch 82 to the START position.

Thus, the present system maintains positive control over the flow of fuel during all phases of engine operation. This not only improves the engine from a standpoint of safety, it also helps to conserve the supply of fuel so that the engine can operate for a relatively long period of time without refueling.

In a further effort to minimize pollutants emanating from the engine as a whole, we sometimes utilize the cold hydrogen gas from supply 12 to condense gases and vapors developed in the crankcase 14b of engine 14. The elements for accomplishing this are shown in dotted lines in FIG. 1. In this event, the gas is fed from valve 48 to regulator 52 by way of a cold trap 83. Also, a pipe 84 extends from the interior of the crankcase through the cold trap to the carburetor air intake section 16a. When the engine is operating, a vacuum is drawn in pipe 84 so that air from the outside is drawn into the crankcase through its vent 86. This fresh air flushes pollutants and gases from the crankcase to the cold trap 83. Within the trap, the pipes 42 and 84 are in intimate heat exchange relation so that the cold hydrogen gas condenses the various noxious gases emanating from the crankcase. The condensate is collected in the trap and removed periodically.

It is apparent from the foregoing then that the present system considerably improves the operation of gaseous fueled engines of this type from the points of view of economy, reliability and safety. It also ensures that the engine has minimum adverse impact on the environment.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

We claim:

1. In a gaseous fueled internal combustion engine, the improvements comprising,
   A. a fuel system which injects a gas under pressure above atmospheric into the engine's fuel-air mixing chamber through a plurality of ports,
   B. a valve associated with each port which opens in response to a selected pressure differential to feed gas into the chamber, and
   C. means for regulating the injection pressure of gas fed into the chamber.
2. The engine defined in claim 1 wherein said valves have progressively increasing cracking pressures so that a precisely controlled amount of gas is injected into the chamber for the prevailing engine load and speed as the regulating means is varied.
3. The engine defined in claim 1 and further including a separate port through which fuel is injected into the mixing chamber as the engine idles.
4. The engine defined in claim 1 and further including
   A. a butterfly valve in the engine air intake above the mixing chamber,
   C. linkage between the butterfly valve and the regulating means so that adjustment of the regulating means also adjusts the butterfly valve so as to maintain a combustible fuel-air mixture in the mixing chamber.
5. The engine defined in claim 1 and further including
   A. means for stopping the flow of fuel to the ports in response to the absence of a control signal, and
   B. means for developing a control signal whenever the engine is running.
6. The engine defined in claim 5 wherein
   A. the stopping means comprise solenoid valves in the flow path to the ports,
   B. the signal developing means comprise means responsive to the pressure in the engine exhaust manifold for maintaining the solenoid valves open as long as the manifold pressure goes beyond a selected value.
7. In a gaseous fueled internal combustion engine, the improvement comprising
   A. a carburetor having an air intake section and a mixing chamber downstream from the intake section,
   B. a first manifold in the mixing chamber,
   C. a plurality of check valves in the manifold arranged to pass gas from the manifold to the mixing chamber,
   D. means for supplying gas to the manifold,
   E. means for regulating the pressure of the gas fed to the manifold,
   F. a separate idling gas supply to the mixing chamber, and
   G. means for controlling the pressure of the gas from the separate supply.
8. The engine defined in claim 7 and further including
   A. a solenoid valve in the gas supply means to the manifold,
   B. a conventional ignition switch connected to open the solenoid valve whenever the switch is in its START position, and C. a switch responsive to the pressure in the engine exhaust manifold, said switch connected so as to open the solenoid valve whenever the engine is running.

9. The engine defined in claim 7 wherein said check valves have progressively increasing cracking pressures.

10. The engine defined in claim 8 and further including a valve in the separate supply which opens only when the ignition switch is in its IGNITION position.

11. In a gaseous-fueled internal combustion engine, the improvement comprising
A. a carburetor having an air intake section and a mixing chamber downstream from the intake section,
B. a first manifold in the mixing chamber,
C. a plurality of ports in the manifold arranged to pass gas from the manifold to the mixing chamber,
D. means for supplying gas to the manifold,
E. means for regulating the pressure of the gas fed to the manifold,
F. a separate idling gas supply to the mixing chamber,
G. means for controlling the pressure of the gas from the separate supply,
H. means for stopping the flow of fuel to the ports in response to a control signal, and
I. means for developing a control signal whenever the engine stops.

* * * * *